United States Patent
Matsuyama et al.

[11] Patent Number: 6,095,591
[45] Date of Patent: Aug. 1, 2000

[54] INTERIOR MATERIAL FOR AUTOMOTIVE VEHICLE

[75] Inventors: Kazuo Matsuyama, Shizuoka; Motoru Komatsu, Kanagawa; Satoru Ichikawa, Kanagawa; Akira Kawai, Kanagawa; Satoru Yoshikawa, Kanagawa, all of Japan

[73] Assignees: Nissan Motor Co., Ltd., Kanagawa; Nihon Plast Co., Ltd., Shizuoka, both of Japan

[21] Appl. No.: 08/956,704

[22] Filed: Oct. 24, 1997

[30] Foreign Application Priority Data

Oct. 25, 1996 [JP] Japan ................................ 8-283894
Nov. 21, 1996 [JP] Japan ................................ 8-309832

[51] Int. Cl.$^7$ ................................................ B60R 27/00
[52] U.S. Cl. ................................... 296/188; 296/189
[58] Field of Search ................................ 296/188, 189

[56] References Cited

U.S. PATENT DOCUMENTS

| | | | |
|---|---|---|---|
| 5,575,500 | 11/1996 | Mimura et al. | 296/189 |
| 5,609,385 | 3/1997 | Daniel et al. | 296/189 |
| 5,660,426 | 8/1997 | Sugimori et al. | 296/189 |
| 5,741,044 | 4/1998 | Kawai et al. | 296/189 |
| 5,833,303 | 11/1998 | Kawai et al. | 296/189 |
| 5,868,458 | 2/1999 | Hirata et al. | 296/189 |
| 5,938,273 | 8/1999 | Williams et al. | 296/189 |

FOREIGN PATENT DOCUMENTS

| | | |
|---|---|---|
| 43 29 406 A1 | 3/1994 | Germany. |
| 195 05 935 A1 | 8/1995 | Germany. |
| 6-239189 | 8/1994 | Japan. |
| 7-2029 | 1/1995 | Japan. |

*Primary Examiner*—Gary C. Hoge
*Attorney, Agent, or Firm*—McDermott, Will & Emery

[57] ABSTRACT

A front pillar garnish adapted to cover a front pillar disposed between a front windshield and a side door in an automotive vehicle. The front pillar garnish comprises a main body section formed of plastic and generally channel-shaped. The main body section is to be fixedly connected to the front pillar and located at the side of a passenger compartment. A plurality of generally plate-shaped energy absorbing ribs are integrally formed at the inner surface of the main body section in a manner to be generally perpendicular to the longitudinal axis of the main body section. A plurality of bosses are integrally formed extending from the inner surface of the main body section. A clip supporting member is fixedly secured to the tip end sections of the bosses and fixedly supported on the edges of the energy absorbing ribs. A clip formed of a spring material is fixedly mounted on the clip supporting member and fixable to the front pillar in order to install the front pillar garnish to the vehicle body.

6 Claims, 11 Drawing Sheets

INTERIOR MATERIAL FOR AUTOMOTIVE VEHICLE

The contents of Japanese Patent Application No. 8-283894 with a filing date of Oct. 25, 1996 in Japan and Japanese Patent Application No. 8-309832 with a filing date of Nov. 21, 1996 in Japan are hereby incorporated by reference.

BACKGROUND OF THE INVENTION

1. Field of the Invention

This invention relates to improvements in an interior material for an automotive vehicle, and more particularly to the improvements in the interior material for covering a panel of a pillar or a roof rail of the automotive vehicle, provided with an impact absorbing structure.

2. Description of the Prior Art

Hitherto many interior materials for an automotive vehicle have been proposed and put into practical use, in which the interior materials have an impact absorbing structure. One of them is disclosed as a pillar garnish in Japanese Patent Provisional Publication No. 6-239189. The pillar garnish is arranged to cover the passenger compartment side of a pillar forming part of a vehicle body. The pillar garnish includes a main body section which is provided at its inner surface with many cylindrical impact absorbing bosses. The pillar is formed with many circular holes which are located corresponding to the energy absorbing bosses of the pillar garnish.

With the thus arranged conventional interior material or pillar garnish, when a pressing impact load is applied onto the main body section of the pillar garnish from the side of the passenger compartment so as to displace the pillar garnish toward the pillar, each impact absorbing boss is frictionally inserted into the corresponding hole of the pillar thereby absorbing the impact load.

In order to effectively accomplish such impact load absorption, it is necessary to enlarge the stroke (time) of the energy absorbing process. This unavoidably requires to ensure a sufficient distance between the surface of the pillar garnish and the pillar and to increase the length of each energy absorbing boss. As a result, the main body section of the pillar garnish protrudes into the passenger compartment away from the pillar, and therefore it becomes impossible to obtain a larger passenger compartment while providing the fear of a pressure feeling being given to the vehicle passenger. Additionally, the pillar garnish main body protruding into the passenger compartment may obstruct smooth getting-in and out actions of the vehicle passenger. Furthermore, the protruding pillar garnish main body section has the fear of narrowing the visual range of the vehicle passenger who sees the outside of the vehicle from the side of the passenger compartment. Therefore, overcoming the above drawbacks has been eagerly desired.

BRIEF SUMMARY OF THE INVENTION

It is an object of the present invention to provide an improved interior material for an automotive vehicle, which can effectively overcome drawbacks encountered in conventional interior materials for an automotive vehicle.

Another object of the present invention is to provide an improved interior material for an automotive vehicle, which is high in energy absorbing efficiency for impact load to be applied to the interior material though the height dimension of the interior material is smaller A further object of the present invention is to provide an improved interior material for an automotive vehicle, which can exhibit an impact wave-form characteristics having a plurality of peaks in deceleration during an energy absorbing process for impact load to be applied to the interior material.

An aspect of the present invention resides in an interior material for an automotive vehicle, comprising a main body section formed of plastic. The main body section is to be fixedly connected to a vehicle body and located at side of a passenger compartment. A structure is connected to the main body section and is to be located between the main body section and the vehicle body. The structure is constructed and arranged to cause the interior material to exhibit an impact wave-form having a plurality of peaks in deceleration.

By virtue of the structure which is constructed and arranged to cause the interior material to exhibit the impact wave-form having a plurality of peaks in deceleration, the impact wave-form of the interior material can be controlled to have a plurality of peaks, thereby effectively accomplishing energy absorption for a pressing impact load applied to the main body section of the interior material. This realizes an energy absorbing structure which is less in the amount of stroke (moving stroke of the main body section of the interior material) even if the energy absorbing amount is the same. As a result, the interior material or pillar garnish can be reduced in thickness thereby ensuring a wide visual range, a comfortableness in the passenger compartment, and an improved getting-on and off performance for the vehicle passenger.

Another aspect of the present invention resides in an interior material for an automotive vehicle, comprising a main body section formed of plastic. The main body section is to be fixedly connected to a vehicle body and located at side of a passenger compartment. A boss is fixedly connected to and extends from the main body section. A clip supporting member is connected to the boss. Additionally, a clip is fixedly secured to the clip supporting member. The clip is to be fixable to the vehicle body so as to install the interior material to the vehicle body.

The interior material is installed to the vehicle body through a two-stage supporting or energy absorbing structure including the clip and the boss. This enhances rising of an impact wave-form to form a first peak at the initial stage of an energy absorbing process. At the next stage, a trough of the wave-form is formed upon the boss collapsing. Thereafter, a second peak is formed in the wave-form, owing to the flexural stiffness of the vehicle body. Thus, the impact wave-form has the two peaks under the energy absorbing action of the boss formed between the clip supporting member and the panel of the vehicle body. This improves an energy absorbing efficiency for a pressing impact load applied to the main body section of the interior material, and realizes an energy absorbing structure which is less in the amount of stroke (moving stroke of the main body section of the interior material) even if the energy absorbing amount is the same. As a result, the interior material or pillar garnish can be reduced in thickness thereby ensuring a wide visual range, a comfortableness in the passenger compartment, and an improved getting-on and off performance for the vehicle passenger.

A further aspect of the present invention resides in an interior material for an automotive vehicle, comprising a main body section formed of plastic. The main body section being to be fixedly connected to a vehicle body and located at side of a passenger compartment. Additionally, at least one energy absorbing rib which is fixed to and extends from the main body section along a plane perpendicular to a longitudinal axis of the main body section. The rib is generally plate-shaped and having an edge facing the vehicle body. The rib is formed with a cutout groove which opens to the edge and extends toward a surface of the main body section to which surface the rib is fixed.

By virtue of the cutout groove formed in the energy absorbing rib in a manner to open to the edge of the rib, the energy absorbing rib can start to tear and collapse from the cutout groove as a tearing starting point. Accordingly, the impact wave-form of the interior material can be controlled to have two peaks, thereby effectively accomplishing energy absorption for a pressing impact load applied to the main body section of the interior material. This realizes an energy absorbing structure which is less in the amount of stroke (moving stroke of the main body section of the interior material even if the energy absorbing amount is the same. As a result, the interior material or pillar garnish can be reduced in thickness thereby ensuring a wide visual range, a comfortableness in the passenger compartment, and an improved getting-on and off performance for the vehicle passenger.

BRIEF DESCRIPTION OF THE DRAWINGS

In the drawings, like reference numerals designate like parts and elements throughout all figures, in which.

DETAILED DESCRIPTION OF THE INVENTION

Figure 9:
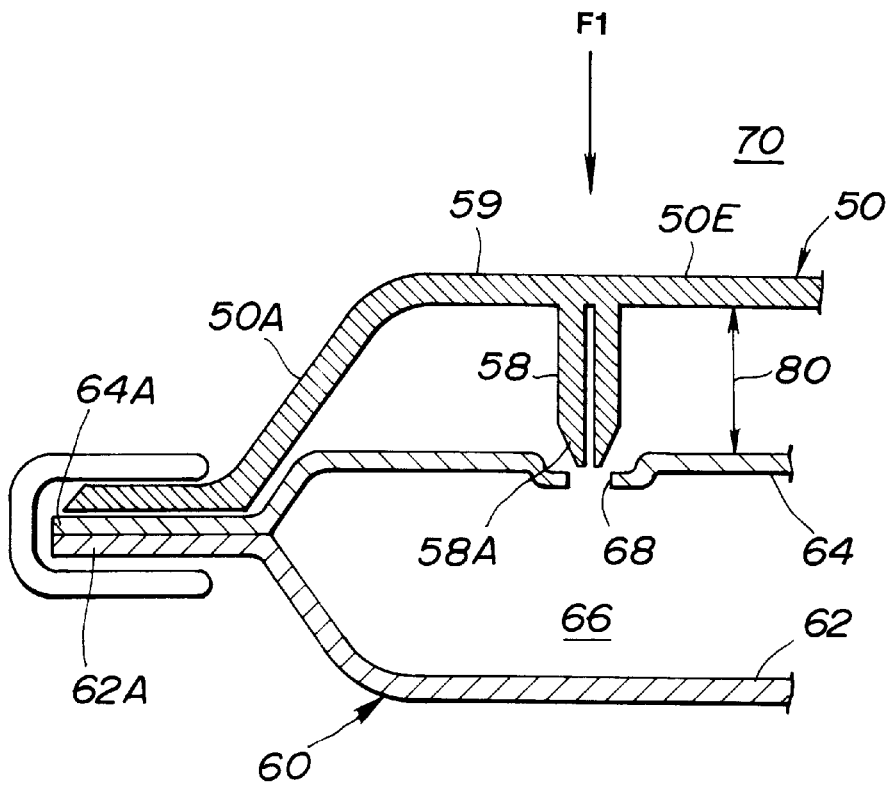
FIG. 9 is a fragmentary sectional view of a part of a conventional interior material.
Figure 10:
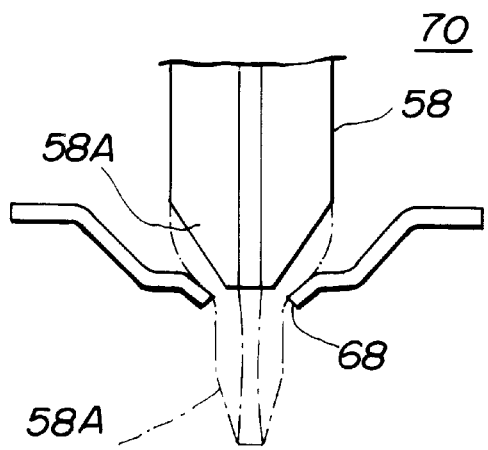
FIG. 10 is a schematic illustration showing an operation of the conventional interior material of FIG. 9.
Figure 11A:
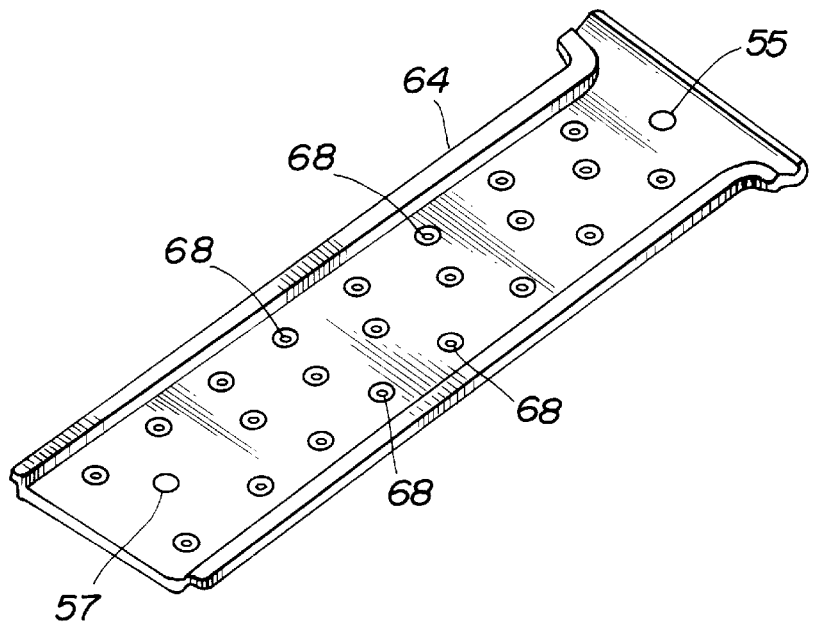
FIG. 11A is a perspective view of a pillar inner panel in connection with the conventional interior material of FIG. 9.
Figure 11B:
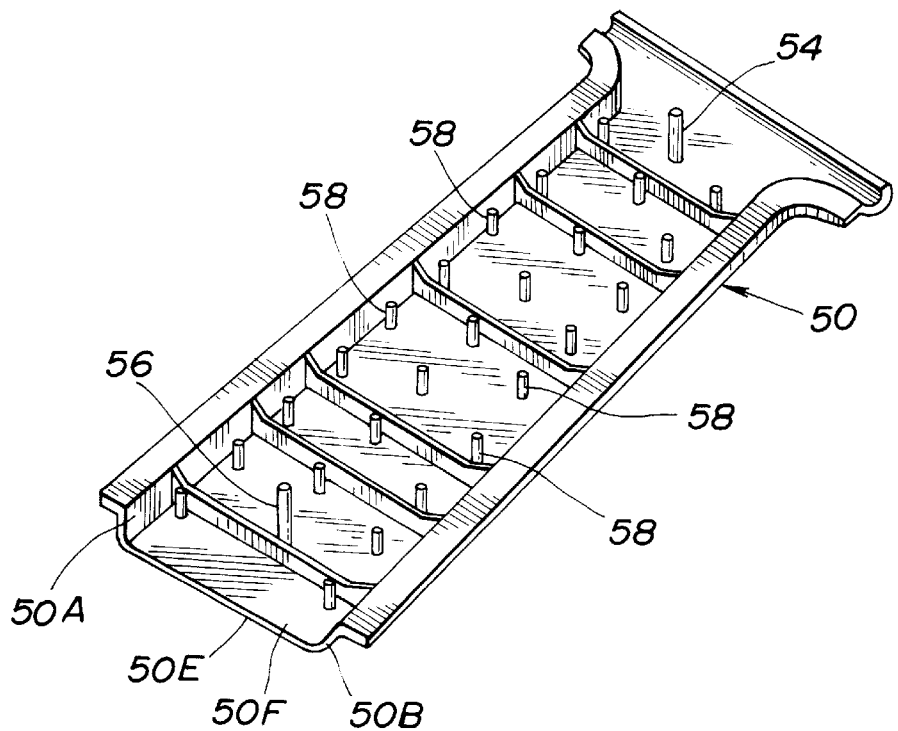
FIG. 11B is a perspective view of the conventional interior material of FIG. 9.

To facilitate understanding of the present invention, a brief reference will be made to a conventional interior material for an automotive vehicle, depicted in FIGS. 9 to 11. The conventional interior material is disclosed in Japanese Patent Provisional Publication No. 6-239189. Referring to FIGS. 9 to 11, the conventional interior material is a pillar garnish 50 which is located at the side of a passenger compartment so as to cover the passenger compartment side of a pillar 60 forming part of a vehicle body. The pillar garnish 50 includes a main body or bottom section 50E which is integrally provided at its opposite end sides with side wall sections 50A, 50B. As shown in FIG. 11B, the main body section 50E has two cylindrical standard bosses 54, 56 which extend perpendicularly from the back side surface 50F of the main body section 50E and located respectively at the longitudinal opposite end portions of the main body section 50E. The standard bosses 54, 56 serve as locational standards when the pillar garnish 50 is installed to the vehicle body. Additionally, many cylindrical impact absorbing bosses 58 are formed all over the backside surface 50F of the main body section 50E and extend perpendicularly from the backside surface 50F. Each impact absorbing boss 58 has a sharpened tip end and is formed small-sized as compared with the standard bosses 54, 56. Each impact absorbing boss 58 is formed thereinside with an elongate hollow 59 which extends along its axis as shown in FIG. 9.

As shown in FIG. 9, the pillar 60 is constituted of a pillar outer panel 62 and a pillar inner panel 64. The pillar outer panel 62 forms part of an outer wall section of the vehicle body, while the pillar inner panel 64 forms part of an inner wall section of the vehicle body. The pillar outer panel 2 and the pillar inner panel 64 are with each other at their flange sections 62A, 64A, thereby providing a closed space 66 between them. The pillar inner panel 64 is formed with many circular holes 68 which are located corresponding to the energy absorbing bosses 58 of the pillar garnish 50 as illustrated in FIG. 11A.

Figure 12:
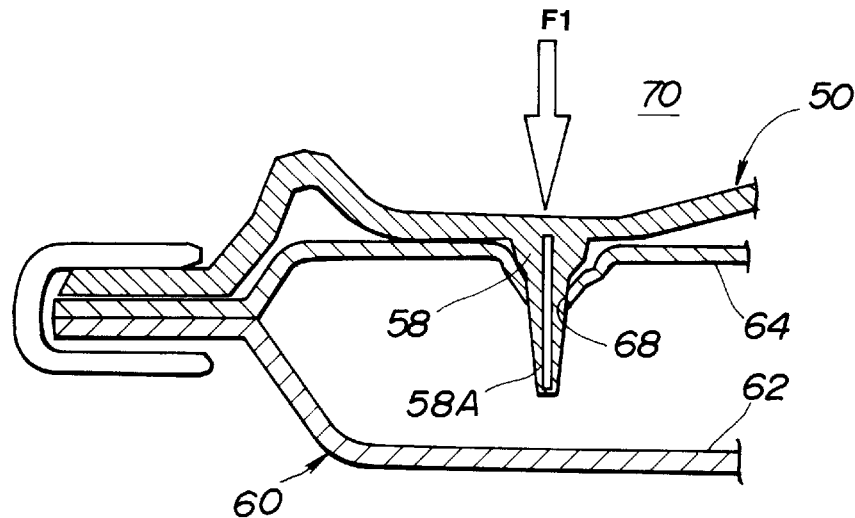
FIG. 12 is a fragmentary sectional view similar to FIG. 9 but showing an operation of the conventional interior material.

With the thus arranged conventional interior material or pillar garnish 50, when a pressing impact load F1 is applied onto the main body 50E of the pillar garnish 50 from the side of the passenger compartment 70 so as to displace the pillar garnish 50 toward the pillar inner panel 64 as shown in FIG. 9, the tip end section 58A of each impact absorbing boss 58 is frictionally inserted into the corresponding hole 68 of the pillar inner panel 64. At this time, the pillar inner panel 64 and the impact absorbing boss 58 are subjected to mutual compulsory deformation made under a transition from normal a normal state (indicated by solid lines in FIG. 10) to a deformed state (indicated in phantom in FIG. 10). However, since the pressing impact load F1 over a predetermined level is absorbed by the many energy absorbing bosses 58, less energy can be absorbed through the initial stage of an energy absorbing process. The energy absorption gradually increases as the energy absorbing bosses 58 are collapsed with proceeding of the enerby absorbing process. Finally, the energy absorbing bosses 58 are completely collapsed, so that the main body 50E of the pillar garnish 50 is brought into press contact with the surface of the pillar inner panel 54 as shown in FIG. 12 thereby making a so-called bottom contact peak in energy absorption (deceleration) as indicated in a generally triangular wave-form indicated by a line L2 in FIG. 1. In view of this and in order to lower the bottom contact peak of the generally triangular wave form, it is necessary to enlarge the stroke (time) of the energy absorbing process. This unavoidably requires to ensure a sufficient distance 80 between the surface of the pillar garnish main body 50E and the pillar inner panel 64 and to increase the length of each energy absorbing boss 58.

As a result, the main body section 50E of the pillar garnish 50 protrudes into the passenger compartment away from the pillar inner panel 64, and therefore it becomes impossible to obtain a larger passenger compartment while providing the fear of a pressure feeling being given to the vehicle passenger. Additionally, the pillar garnish main body 50E protruding into the passenger compartment 70 may obstruct smooth getting-in and out actions of the vehicle passenger. Furthermore, the protruding pillar garnish main body 50E has the fear of narrowing the visual range of the vehicle passenger who sees the outside of the vehicle from the inside of the passenger compartment 70. Therefore, overcoming the above drawbacks has been eagerly desired.

Figure 3:
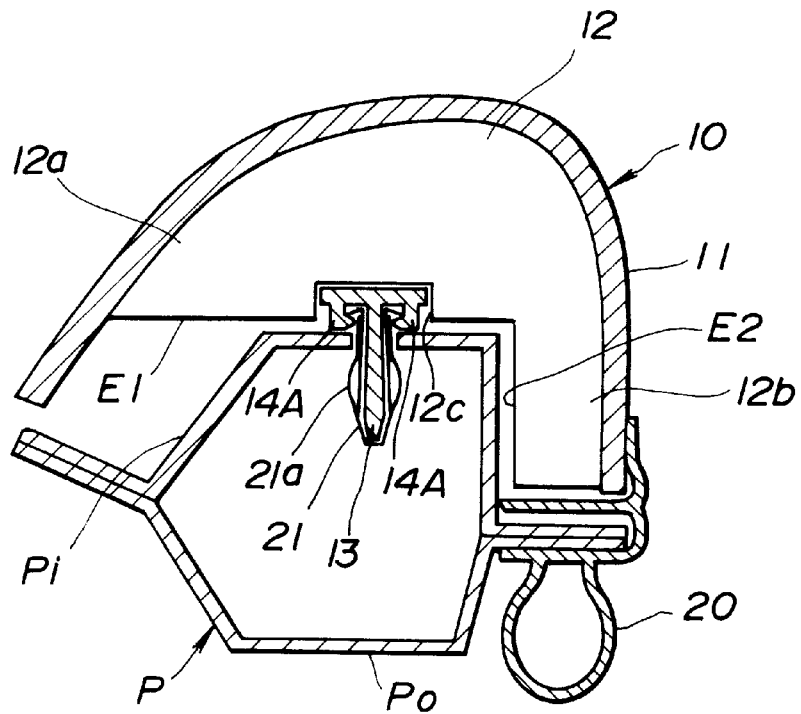
FIG. 3 is a cross-sectional view of a first embodiment of the interior material according to the present invention.
Figure 4:
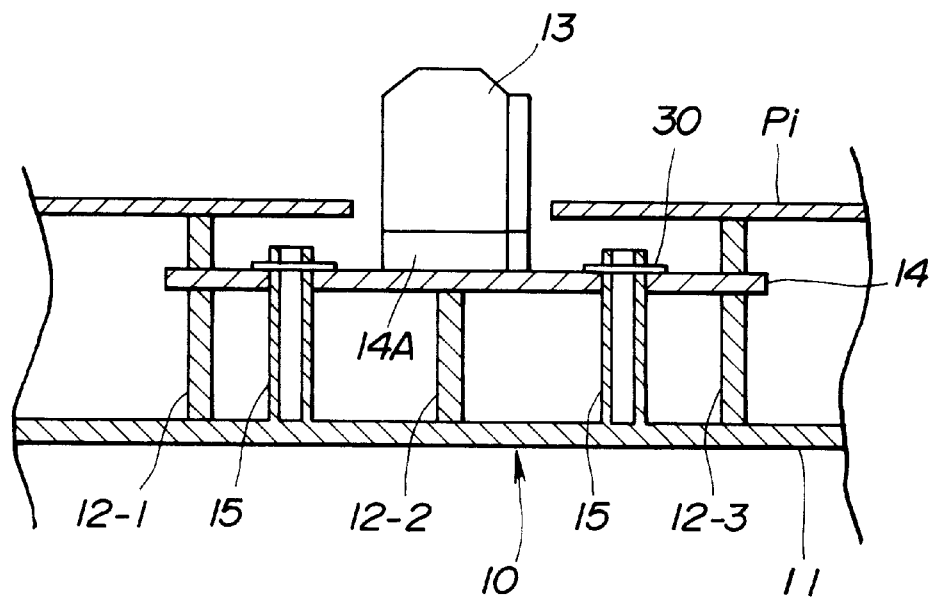
FIG. 4 is a fragmentary sectional view of a part of the interior material of FIG. 3, in which a clip is omitted.
Figure 5:
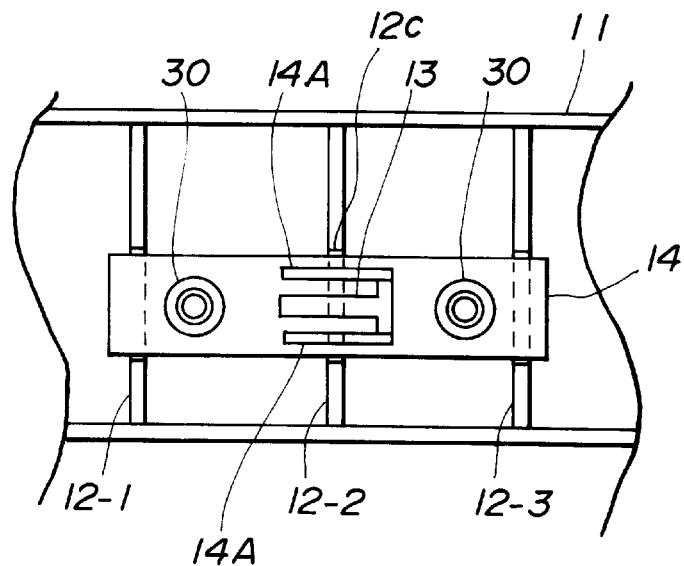
FIG. 5 is a fragmentary plan view of a part of the interior material of FIG. 3, in which the clip is omitted.

In view of the above description of the conventional interior material or pillar garnish, reference is now made to FIGS. 3 to 5, wherein a first embodiment of an interior material or member for an automotive vehicle, according to the present invention is illustrated by the reference numeral 10. The interior material 10 of this embodiment is a front pillar garnish for covering a front pillar P forming part of a vehicle body of the automotive vehicle. The front pillar P extends generally vertical and disposed between a front windshield glass (not shown) and a side door or window glass (not shown). The front pillar includes inner and outer panels Pi, Po which are combined with each other, for example, by spot welding which is made at the flange sections of the panels Pi, Po, so that a closed space (not identified) is defined between the inner and outer panels Pi, Po. A seal member 20 formed of rubber is installed at the side of a vehicle passenger or of the side door window glass to cover a clearance between the pillar garnish 10 and the welded flange sections of the panels Pi, Po.

The pillar garnish 10 is formed of a thermoplastic resin such as ABS resin or polypropylene resin and secured relative to the front pillar P in a manner to be disposed adjacent the inner panel Pi of the front pillar P. The pillar garnish 10 includes a generally channel-shaped outer shell section or main body section 11 which extends generally vertical along the length of the front pillar P. The outer shell section 11 is generally C-shaped in section taken along a transverse plane to which the axis of the outer shell section 11 is perpendicular. A plurality of generally plate-shaped energy absorbing ribs 12 are formed integral with the outer shell section 11 and extends from the inner surface of the outer shell section 11 toward the front pillar inner panel Pi. Each energy absorbing rib 12 is generally plate-shaped and extends generally along the transverse plane. In other words, each energy absorbing rib 12 is generally L-shaped in plan or as viewed from the upper side of the vehicle as shown in FIG. 3 so that the energy absorbing rib 12 generally occupies, in plan, a space defined between the outer shell 11 of the pillar garnish 10 and the inner panel Pi of the front pillar P. More specifically, each energy absorbing rib 12 has a long straight edge El facing the side flat section (not identified) of the inner panel Pi, and a short straight edge E2 facing the rear flat section (not identified) of the inner panel Pi. Each energy absorbing rib 12 includes first and second sections 12a, 12b which are integral with each other. The first section 12a extends generally in the fore-and-aft direction of the vehicle body and has the long straight edge E1. The second section 12b extends generally laterally or in the outboard direction relative to the vehicle body and has the short straight edge E2. The long and short straight edges E1, E2 are arranged generally L-shaped. The second section 12b is located rear relative to the first section 12a in the fore-and-aft direction of the vehicle body.

The energy absorbing ribs 12 include ones 12-1, 12-2, 12-3 which are formed respectively with cutouts 12c which are aligned along the axis of the outer shell section 11 of the pillar garnish 10. Each cutout 12c is opened at the long straight edge E1 as shown in FIG. 3. In this embodiment, a clip supporting plate or member 14 is mounted on the three energy absorbing ribs 12-1, 12-2, 12-3 and fitted at the cutouts of the energy absorbing ribs. The clip supporting plate 14 is fixed to the outer shell section 11 through bosses 15, 15. Each boss 15 is hollow and integral with the outer shell section 11 to extend from the outer shell section 11 in parallel with the energy absorbing ribs 12. More specifically, the tip end section of each boss 15 passes through the clip supporting plate 14, in which an annular clip 30 is fixedly fitted around the tip end section (projected from the clip supporting plate 14) as shown in FIGS. 4 and 5. It is to be noted that the inner peripheral portion of the annular clip 30 bites into the outer peripheral portion of the projected tip end section of the boss 15 so that the annular clip 30 is prevented from getting out of the boss 15. Otherwise, the clip supporting plate 14 may be fixed to the bosses 15 by means of thermal caulking, bonding with adhesive, or bolt-connection.

A generally plate-shaped clip supporting section 13 is formed integral with the clip supporting plate 14 and extends perpendicular to the clip supporting plate 14 and generally in a direction away from the energy absorbing ribs 12. Two rails 14A having generally L-shaped cross-section are formed integral with the clip supporting plate 14 and extend parallel with the clip supporting section 13, in which a groove is formed between each rail 14A and the clip supporting member 14A, the groove being closed at its one end as shown in FIG. 5. A generally saddle-shaped clip 21 is mounted on the clip supporting member 13 in such a manner that the opposite bent ends of the saddle-like clip 21 are fitted respectively in the grooves each formed between the rail 14A and the clip supporting section 13. The clip 21 is formed of a material (such as spring plate or sheet) having spring characteristics and has movable portions 21a which can be distorted laterally inwardly. FIG. 4 shows the pillar garnish 10 in a state in which the clip 21 is omitted, and FIG. 5 shows the pillar garnish 10 as viewed from the upper side in a state in which the clip 21 has not been installed in position, and the pillar garnish has not yet been installed to the front pillar P of the vehicle body.

The thus arranged front pillar garnish 10 is installed to the front pillar P in the following manner: The clip 21 fixedly secured to the clip supporting plate 14 through the clip supporting member 13 and the rails 14A, 14B is inserted into a hole (not identified) formed in the inner panel Pi of the front pillar 10. At this time, the movable portions 21a, 21a of the clip 21 are distorted inwardly in sliding contact with the periphery (defining the hole) of the front pillar inner panel Pi. After the movable portions 21a, 21a of the clip 21 have passed through the hole, the movable portions 21a, 21a are projected outwardly thereby preventing the clip 21 from getting out of the hole of the front pillar inner panel Pi. As a result, the front pillar garnish 10 is securely installed to the front pillar P of the vehicle body.

As appreciated from the above, the above embodiment of the interior material or pillar garnish is installed to the vehicle body through a two-stage supporting structure including the clip 21 and the boss 15 (and/or the ribs 12), and therefore offers advantageous effects which will be discussed hereinafter.

That is, the bosses and the energy absorbing ribs disposed between the clip supporting plate and the outer shell section maintain a reaction to a certain extent against an impact load at the initial stage of the energy absorbing process. Then, the bosses and the energy absorbing ribs collapse to remove the reaction as the impact load increases. Thereafter, the impact load again increases when the outer shell section is brought into contact with the vehicle body. This phenomena in the energy absorbing process is schematically illustrated as an impact wave-from indicated by a line L1, in FIG. 1. The line L2 indicates the corresponding impact wave-form of the conventional interior material or pillar garnish shown in FIGS. 9 to 12 as mentioned above.

Figure 1:
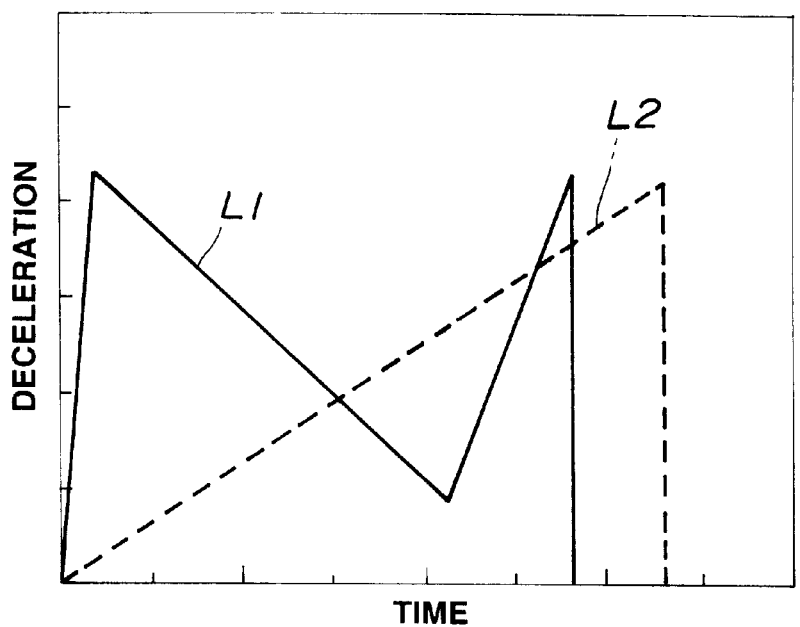
FIG. 1 is a graph showing a schematic impact wave-form or the relationship between the deceleration and the time, in connection with interior materials of the present invention in comparison with a conventional interior material.

As apparent from FIG. 1, the impact wave-form L1 of the present invention has two peaks whereas that L2 of the conventional interior material has only one peak which is located at a later time. In case of the impact wave-form L1, the first peak initially appears representing a peak deceleration value due to the reaction of the ribs. Then, the deceleration value drops owing to collapsing of the ribs as the impact load increases. Thereafter, the second peak appears upon the outer shell section being brought into contact with the vehicle body.

Figure 2:
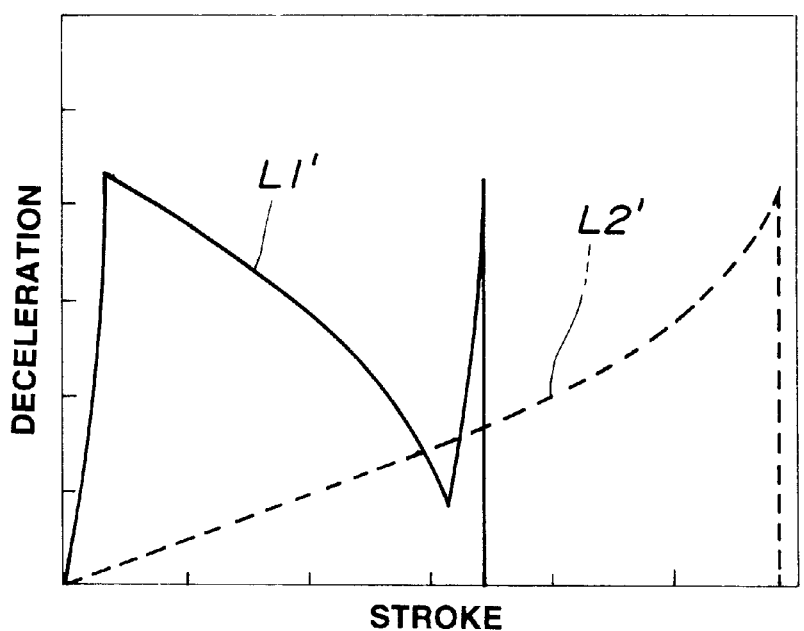
FIG. 2 is a graph showing a schematic impact wave-form or the relationship between the deceleration and the stroke, in connection with the interior materials of the present invention in comparison with the conventional interior material.

Here, difference in amount of stroke (moving stroke of the main body section of the interior material) between the interior material of the present invention and the conventional interior material is schematically illustrated as impact wave-forms in FIG. 2 on the assumption that the both interior materials are the same in energy absorbing amount. Lines L1' and L2' indicate respectively wave-forms of the interior material of the present invention and the conventional interior material. As apparent from the amount of stroke, according to the present invention, two peaks of the wave-form L1' representing energy absorption for the pressing impact load or the like appear owing to the two-stage supporting or energy absorbing structure including the clip and the combination of the bosses and the ribs. This decreases the amount of stroke though the energy absorbing amount is the same and therefore realizes the pillar garnish having a reduced thickness, as compared with the case L2' of the conventional interior material or pillar garnish. By thus reducing the thickness of the pillar garnish, the vehicle passenger can ensure a wide visual range, a comfortableness in the passenger compartment, and an improved getting-on and off performance.

Figure 6:
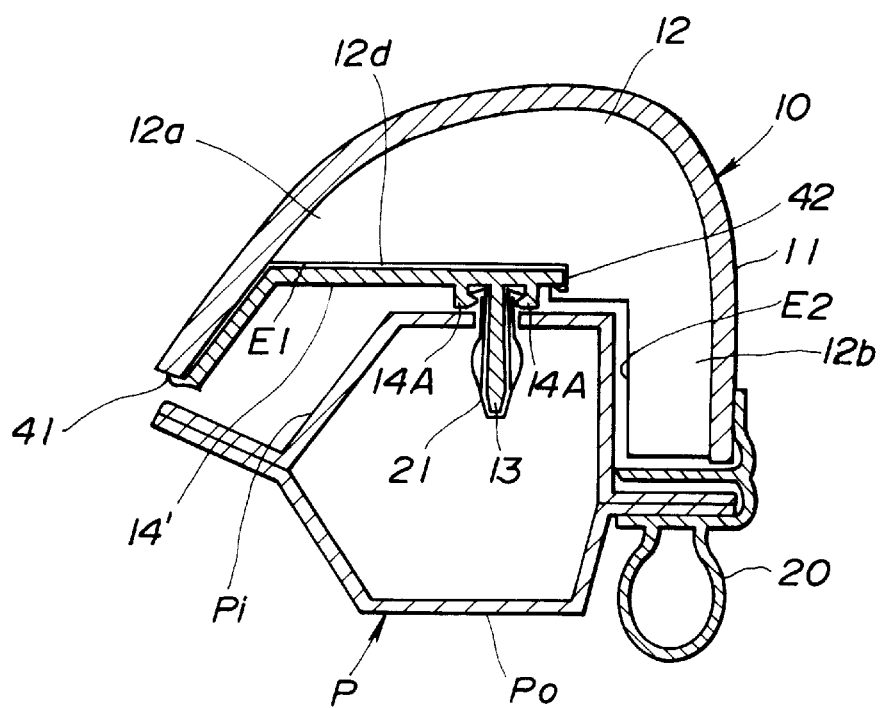
FIG. 6 is a cross-sectional view similar to FIG. 3 but showing a modified example of the first embodiment interior material.
Figure 7:
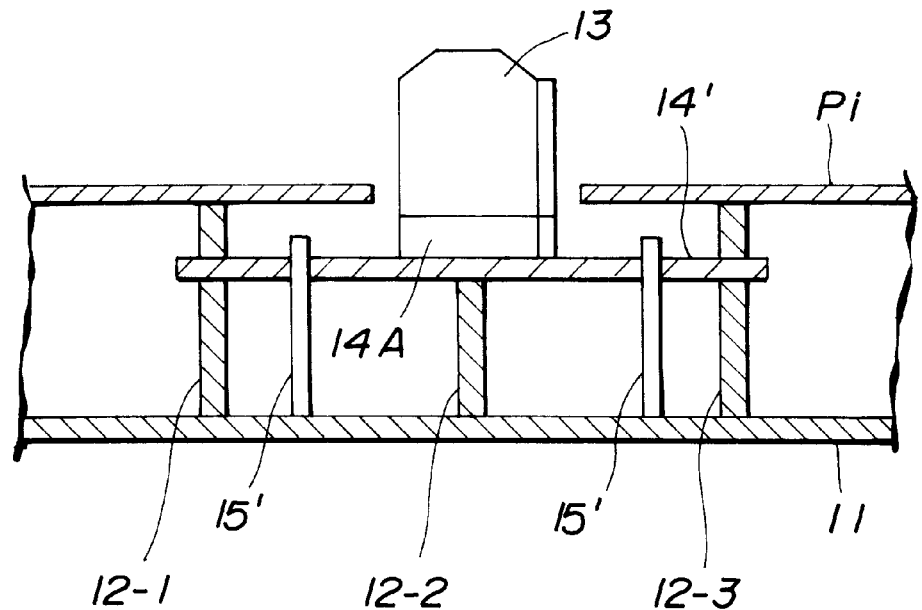
FIG. 7 is a fragmentary sectional view of a part of the interior material of FIG. 6, in which a clip is omitted.
Figure 8:
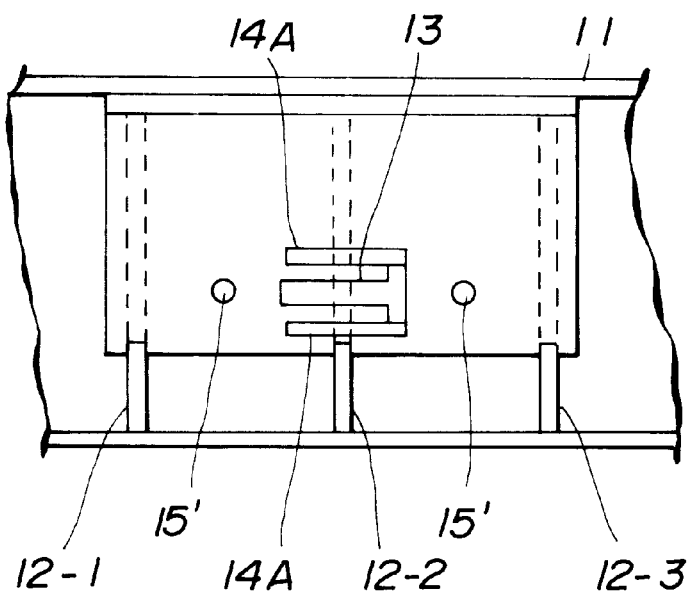
FIG. 8 is a fragmentary plan view of a part of the interior material of FIG. 6, in which the clip is omitted.

FIGS. 6 to 8 illustrate a modified example of the first embodiment of the interior material or pillar garnish 10, similar to the first embodiment. In this embodiment, the clip supporting plate 14' is formed or molded to be integral with the front-side end (extending generally vertical) of the outer shell 11 of the front pillar garnish 10 and formed generally L-shaped in section as shown in FIG. 6. The thus formed clip supporting plate 14' is bent at a bent or hinge portion 41 and located to be mounted on the energy absorbing ribs 12 at cutouts 12d, in which the tip end portion of the clip supporting plate 14' is fitted in a fitting depression 42 formed at the rear-side end of the cutout 12b. The clip supporting plate 14' is positioned by means of the bosses 15' which project from the outer shell section 11. More specifically, the tip end section of each boss 15' is inserted into a hole (not identified) formed in the clip supporting plate 14' as shown in FIGS. 7 and 8. With this arrangement, the clip supporting plate 14' can be formed without taking account of a direction in which a die for molding is extracted, thereby enlarging freedom in design for engagement between the interior material and the vehicle body.

Figure 13:
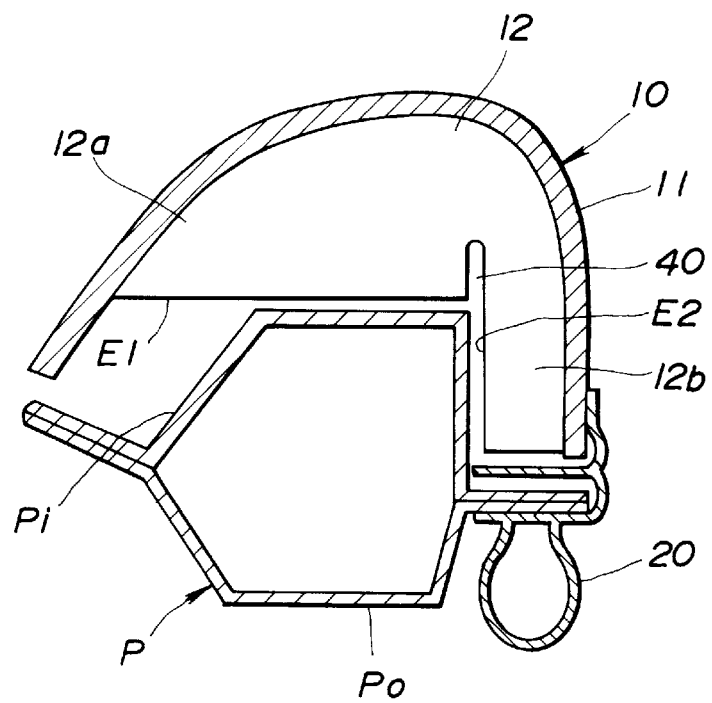
FIG. 13 is a cross-sectional view of a second embodiment of the interior material according to the present invention.

FIG. 13 illustrates a second embodiment of the interior material or pillar garnish 10 according to the present invention, similar to the first embodiment one. In this embodiment, each energy absorbing rib 12 is generally L-shaped and includes the first and second sections 12a, 12b which are integral with each other. The first section 12a extends generally in the fore-and-aft direction of the vehicle body and has the long straight edge E1. The second section 12b extends generally laterally or in the outboard direction relative to the vehicle body and has the short straight edge E2. The long and short straight edges E1, E2 are arranged generally L-shaped. The second section 12b is located rear relative to the first section 12a in the fore-and-aft direction of the vehicle body.

An elongate cutout groove 40 is formed in each energy absorbing rib 12 in a manner to open to the long straight edge E1. More specifically, the cutout groove 40 is located in the rear end portion of the first section 12a and extends along the extension of the short straight edge E2 and perpendicular to the long straight edge E1. In other words, the elongate cutout groove 40 opened generally at a location at which the long and short straight edges E1, E2 cross each other. The cutout groove 40 is defined by straight parallel inner edges 40a, 40b. The inner edge 40a is perpendicular and contiguous to the long straight edge E1 of the first section 12a of the energy absorbing rib 12, while the inner edge 40b is aligned with the short straight edge E2 of the second section 12b of the energy absorbing rib 12.

It is preferable that the cutout groove 40 has a width a ranging from 1 mm to 4 mm, and a depth b1 not larger than a value (a×1.5) mm. If the width a is increased over 4 mm, the first peak (representative of a reaction of the rib 12) of the impact wave-form (indicated by the line L1 in FIG. 1) is lowered, in which it is assumed to be required to increase the thickness of the rib in order to raise the first peak so as to obtain a sufficient energy absorbing effect. However, increasing the rib thickness unavoidably produces shrinkage cavity at the outer surface of the outer shell section 11 of the pillar garnish 10 thereby deteriorating the external appearance of the pillar garnish as a hard trim part. If the width a is reduced to be smaller than 1 mm, a part (for setting the cutout groove 40) of a metallic die is insufficient in strength during injection-molding of the pillar garnish using the metallic die, so that it is impossible to produce many pillar garnishes by using one metallic die. This unavoidably require a plurality of metallic dies thereby increasing production cost of the pillar garnish. Additionally, if the depth b1 is increased over the value (a×1.5) mm, the part of the metallic die is insufficient in strength.

Figure 14:
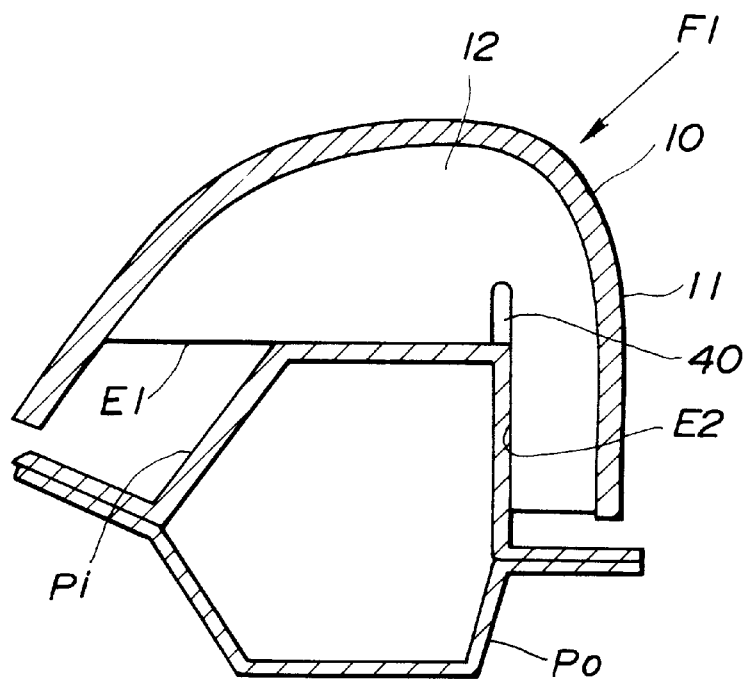
FIG. 14 is a cross-sectional view similar to FIG. 13 but showing an operational mode of the interior material of FIG. 13.
Figure 15:
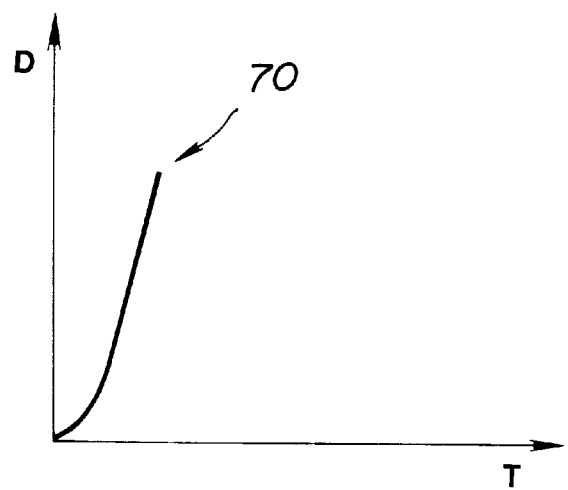
FIG. 15 is a graph showing the relationship between the lapsed time from impact of the head of a vehicle passenger against the interior material of FIG. 13 and the deceleration of the head during an impact absorbing process in a simulation test, in which this graph corresponds to the operational mode of FIG. 14.

With the thus arranged interior material or pillar garnish 10, when the vehicle passenger strikes against the pillar garnish 10 with a pressing impact load F1 (over a predetermined value) in a direction indicated by an arrow, for example, during occurrence of a so-called secondary collision as shown in FIG. 14. It will be understood that the predetermined value is, for example, 900 kg under 200 G on the assumption that the weight of the head of the vehicle passenger is 4.5 kg. The pressing impact load F1 causes the long straight edge E1 of each energy absorbing edge 12 to strike against the surface of the inner panel Pi of the front pillar P, generating an initial reaction indicated at the first peak 70 in FIG. 15 which illustrates the relationship between the lapsed time T from the time of impact of the head of a vehicle passenger against the pillar garnish and the deceleration D of the head during an impact absorbing process in a simulation test.

Figure 16:
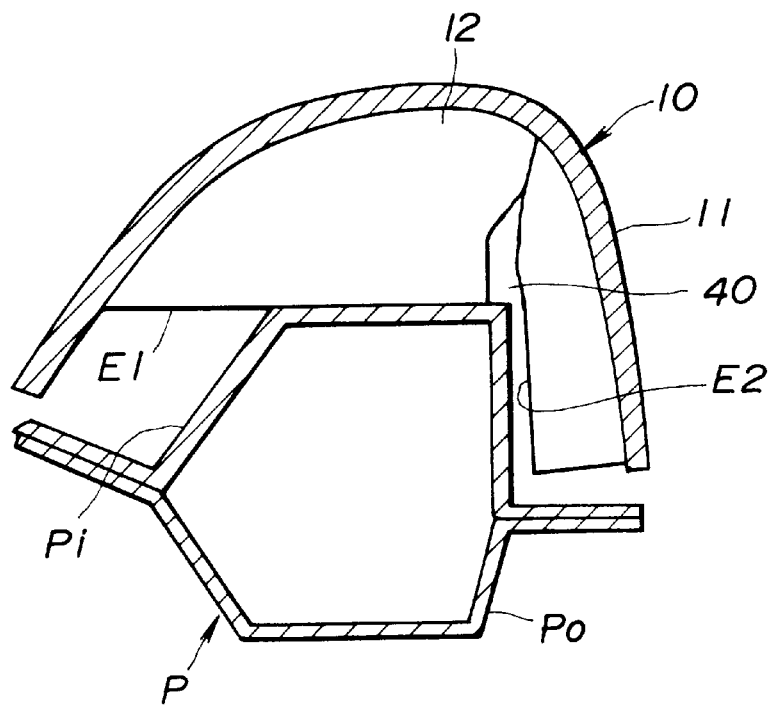
FIG. 16 is a cross-sectional view similar to FIG. 13 but showing another operational mode of the interior material of FIG. 13.
Figure 17:
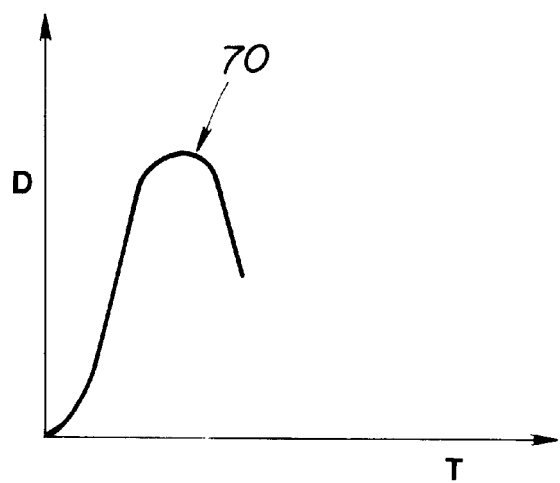
FIG. 17 is a graph similar to FIG. 15 but corresponds to the operational mode of FIG. 16.
Figure 18:
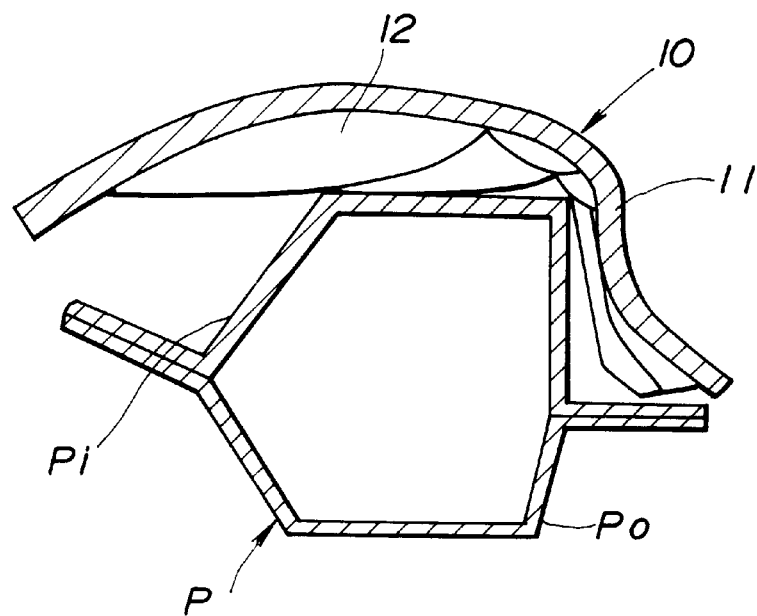
FIG. 18 is a cross-sectional view similar to FIG. 13 but showing a further operational mode of the interior material of FIG. 13.
Figure 19:
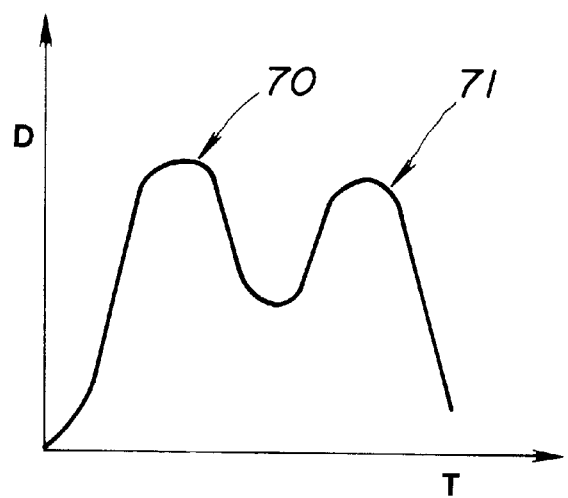
FIG. 19 is a graph similar to FIG. 15 but corresponds to the operational mode of FIG. 18.
Figure 20:
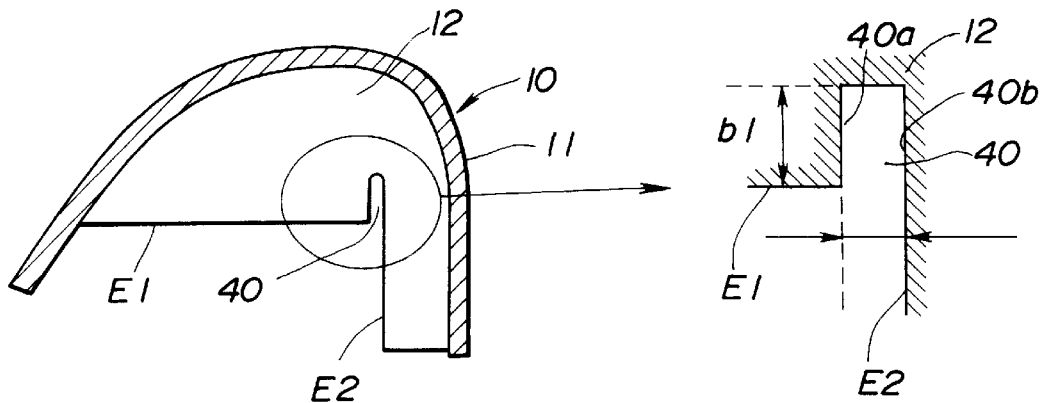
FIG. 20 is an illustration including a fragmentary enlarged view of a cutout groove formed in an energy absorbing rib of the interior material of FIG. 13.

Then, as shown in FIG. 16, the energy absorbing rib 12 is torn from the bottom of the cutout groove 40 under the action of the cutout groove 40 formed in the energy absorbing rib 12. As a result, the initial reaction 70 reduces as shown in FIG. 17. At this time, as shown in FIG. 18, the free end section (including the straight edges E1, E2) of the energy absorbing rib 12 are collapsed or buckled and strikes against the surface of the inner panel Pi of the front pillar P, so that the reaction again increases to form the second peak 71 as shown in FIG. 19. Thereafter, the reaction force decreases so that the energy absorbing stroke is reduced.

Figure 21:
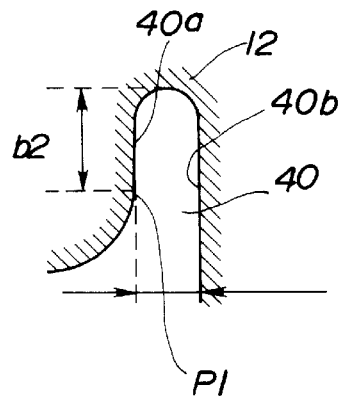
FIG. 21 is a fragmentary enlarged view of a cutout groove similar to that in FIG. 20, but showing an essential part of a modified example of the interior material of the second embodiment.

FIG. 21 illustrates an essential part of a modified example of the second embodiment interior material or pillar garnish 10. In this modified example, the cutout groove 40 is defined by the straight parallel inner edges 40a, 40b. The inner edge 40a is perpendicular and contiguous to the long straight edge E1 of the first section 12a of the energy absorbing rib 12, while the inner edge 40b is aligned with the short straight edge E2 of the second section 12b of the energy absorbing rib 12. In this example, a portion at which the inner edge 40a is contiguous to the long straight edge E1 is rounded without forming a pointed corner, so that the inner edge 40a is curved generally from an intermediate position PI to form a rounded corner. The intermediate point PI is axially separate by a distance or depth b2 from the closed extreme end of the cutout groove 40. In this example, it is preferable that the cutout groove 40 has a width a ranging from 1 mm to 4 mm, and a depth b2 not larger than a value (a×1.5) mm. If the depth b1 is increased over the value (a×1.5) mm, the part of the metallic die is insufficient in strength as discussed above. In this case shown in FIG. 21, by setting the width a of the cutout groove 40 within a range of from 1 mm to 4 mm, and the depth b2 within a range of not larger than the value (a×1.5) mm, the first peak of the impact wave-form in FIG. 1 can be suppressed at a relatively low level as compared with a case where no cutout groove is formed in each energy absorbing rib 12, preventing the first peak from its excessive lowering, thus accomplishing formation of a desirable two peaks-wave form. This makes it possible to reduce the thickness of the pillar garnish 10. Additionally, a sufficient strength of the metallic die during formation of the cutout groove 40 in the energy absorbing rib 12 can be attained thereby lowering the production cost of the pillar garnish under injection-molding.

As apparent from the above, the second embodiment interior material or pillar garnish 10 functions as follows: The energy absorbing rib formed perpendicular to the longitudinal direction of the pillar garnish maintains the reaction to a certain extent against the impact load at the initial stage of the energy absorbing process. Then, the rib tears from the cutout groove (as a tearing starting point) and collapses so as to remove the reaction as the impact load increases over a predetermined level. Thereafter, the impact load again increases when the outer shell section is brought into contact with the vehicle body. This phenomena in the energy absorbing process is schematically illustrated as the impact wave-from indicated by the line L1, in FIG. 1. The impact wave-form of the pillar garnish 10 having the energy absorbing rib 12 formed with the cutout groove 40 takes the two (first and second) peaks as indicated by the line L1 in FIG. 1. The first peak represents the peak value caused by the reaction of the rib. After occurrence of the first peak, the rib starts to collapse from the cutout groove as the starting point so that drop in deceleration value appears. Thereafter, the outer shell section 11 comes into contact with the vehicle body so that the second peak appears.

Also in connection with this embodiment, the difference in amount of stroke (moving stroke of the main body section of the interior material) between the interior material of the present invention and the conventional interior material is commonly established as schematically illustrated as the impact wave-forms in FIG. 2 on the assumption that the both interior materials are the same in energy absorbing amount. The lines L1' and L2' indicate respectively wave-forms of the interior material of the present invention and the conventional interior material. As apparent from the amount of stroke, according to the present invention, two peaks of the wave-form L1' representing energy absorption for the pressing impact load or the like appear owing to the two-stage supporting or energy absorbing structure established under the action of the rib 12 formed with the cutout groove 40. This decreases the amount of stroke though the energy absorbing amount is the same and therefore realizes the pillar garnish having a reduced thickness, as compared with the case L2' of the conventional interior material or pillar garnish. By thus reducing the thickness of the pillar garnish, the vehicle passenger can ensure a wide visual range, a comfortableness in the passenger compartment, and an improved getting-on and off performance.

While the energy absorbing rib 12 has been shown and described as having the same thickness throughout the whole area, it will be understood that the thickness of the rib 12 may increase in a direction from the edges E1, E2 to the inner surface or back-side surface of the outer shell section 11. In general, in case that a plate member buckles, the initial load of the buckling is high; however, the load rapidly lowers as the angle of bending of the plate member increases, and then the load abruptly rises. In this regard, in case of increasing the thickness of the rib 12 as mentioned above, the load to be required to bend the rib 12 increases as bending of the rib 12 under the load proceeds, and therefore the impact absorbing load can be prevented from its abrupt lowering due to the fact that the angle of bending increases under proceeding of buckling of the rib 12. This reduces unevenness in impact absorbing load throughout the impact absorbing process.

Additionally, an increment in thickness of the rib 12 may not be continuous so that the thickness of the rib 12 increases stepwise so that a predetermined area has the same thickness. This can set more peaks than those in FIG. 1 during the impact absorbing process. Further, the thickness of the rib 12 may increase stepwise from a portion corresponding to the bottom of the cutout groove 40, in which the impact absorbing loads before and after a time at which bending and collapsing of the rib 12 have reached the bottom of the cutout groove 40 can be freely set. If there arises the problem of shrinkage depression being made in the outer shell section 11 of the pillar garnish 10, the thickness of each rib can be set smaller upon increasing the number of the ribs.

Figure 22:
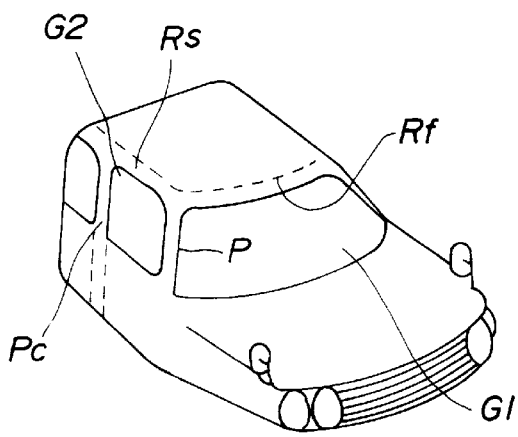
FIG. 22 is a schematic fragmentary perspective view of a part of an automotive vehicle body, illustrating the locations of a variety of garnishes to which the principle of the present invention is applicable.

While the front pillar garnishes 10 have been shown and described as the embodiments so that each pillar garnish is installed to cover the passenger compartment side of the front pillar P illustrated in FIG. 22 showing a part of an automotive vehicle body, it will be appreciated that the principle of the present invention may be applied to other garnishes such as a center pillar garnish installed to cover the passenger compartment side of a center pillar Pc, a front roof rail garnish installed to cover a front roof rail Rf, a side roof rail garnish installed to cover a side roof rail Rs, a rear pillar garnish installed to cover a rear pillar (not shown), and a rear roof rail garnish installed to cover a rear roof rail (not shown) in FIG. 22 in which the reference characters G1 and G2 denote respectively a front windshield glass and a side wind window glass.

What is claimed is:

1. An interior material for an automotive vehicle, comprising:
    a main body section formed of plastic, said main body section being to be fixedly connected to a vehicle body and located at side of a passenger compartment;
    a boss fixedly connected to and extending from said main body section;
    a clip supporting member connected to said boss; and
    a clip fixedly secured to said clip supporting member, said clip being to be fixable to the vehicle body so as to install said interior material to the vehicle body.

2. An interior material as claimed in claim 1, further comprising at least one energy absorbing rib which is fixed to and extends from the main body section along a plane perpendicular to a longitudinal axis of said main body section, said rib being generally plate-shaped and adapted to support said clip supporting member in position.

3. An interior material as claimed in claim 2, wherein said main body section includes a generally channel-shaped outer shell section which extends generally vertical relative to the vehicle body, wherein said interior material further comprises a plurality of ribs which are formed integral with said outer shell section and extends from the inner surface of said outer shell section, each rib being formed parallel with a plane perpendicular to a longitudinal axis of said outer shell section, wherein said clip supporting member is plate-shaped and extends along the longitudinal axis of said outer shell section, said clip supporting member being fixedly connected to said outer shell section through said boss, said clip supporting member including a plate-shaped clip supporting section which extends generally in a direction away from said ribs, wherein said clip being formed of a material having a spring characteristics and formed generally saddle-shaped, said clip being securely mounted on said clip supporting section, said clip having a laterally movable portions which is to be inserted inside an inner panel of a pillar member forming part of the vehicle body, through a hole formed in the inner panel.

4. An interior material as claimed in claim 3, wherein said clip supporting member is fixedly secured to a tip end section of said boss.

5. An interior material as claimed in claim 3, wherein said clip supporting member has an longitudinal end portion which is formed integral with an end portion of said outer shell section which end portion extends along the longitudinal axis of said outer shell section, the longitudinal end portion of said clip supporting member being hingedly connected to the end portion of said outer shell section so that said clip supporting member is mounted on said rib, said clip supporting member being fixed to said rib.

6. An interior material as claimed in claim 3, wherein each energy absorbing rib has an edge facing the vehicle body, the edge having a first straight edge, and a second straight edge which is perpendicular to the first straight edge, the first straight edge being generally parallel with a first flat surface of the vehicle body, the second straight edge being generally parallel with a second flat surface of the vehicle body.

* * * * *